United States Patent
Imai et al.

(10) Patent No.: US 6,642,471 B2
(45) Date of Patent: Nov. 4, 2003

(54) METHOD FOR THE PROJECTION WELDING OF HIGH-CARBON STEELS AND HIGH-TENSION LOW-ALLOY STEELS

(75) Inventors: Kaneyuki Imai, Mishima (JP); Ryuichi Kusanagi, Numazu (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 09/870,883

(22) Filed: May 31, 2001

(65) Prior Publication Data

US 2002/0017554 A1 Feb. 14, 2002

(30) Foreign Application Priority Data

Feb. 6, 2000 (JP) .......................... 2000-166387

(51) Int. Cl.$^7$ .................. B23K 11/00; B23K 11/06; B23K 11/16; B23K 9/00
(52) U.S. Cl. ................... 219/78.02; 219/81; 219/117.1; 219/118
(58) Field of Search ................ 228/246; 219/78.02, 219/118, 117.1, 81

(56) References Cited

U.S. PATENT DOCUMENTS

| | | | | |
|---|---|---|---|---|
| 3,683,147 A | * | 8/1972 | Orts | 219/92 |
| 4,118,543 A | * | 10/1978 | Donohue | 428/615 |
| 4,273,983 A | * | 6/1981 | Ogawa et al. | 340/674 |
| 4,305,087 A | * | 12/1981 | Wislocky | 257/694 |
| 4,480,166 A | * | 10/1984 | Leech | 219/118 |
| 5,136,135 A | * | 8/1992 | Bratschun et al. | 219/118 |
| 5,328,527 A | * | 7/1994 | Kurup et al. | 148/318 |
| 5,330,097 A | * | 7/1994 | Inoue | 219/78.02 |
| 5,473,133 A | * | 12/1995 | Peterson | 219/81 |
| 5,942,135 A | * | 8/1999 | Rau | 219/117.1 |
| 6,037,559 A | * | 3/2000 | Okabe et al. | 219/118 |
| 6,222,150 B1 | * | 4/2001 | Nomura et al. | 219/78.02 |

FOREIGN PATENT DOCUMENTS

| | | | |
|---|---|---|---|
| JP | 05-212552 A | * | 8/1993 |
| JP | 06-49504 A | * | 2/1994 |
| JP | 63-126682 A | * | 5/1998 |

\* cited by examiner

Primary Examiner—Tom Dunn
Assistant Examiner—L. Edmondson
(74) Attorney, Agent, or Firm—Anthony J. Casella; Gerald E. Hespos

(57) ABSTRACT

This invention provides an improved method of projection welding which enables the sound welding of high-carbon, and high-tension low-alloy steels. A spacer is disposed between two parts to be joined by projection welding. At least one of the parts is made of a high-carbon, or high-tension low-alloy steel. The spacer is a thin sheet, or coating formed on at least one of those parts.

15 Claims, 3 Drawing Sheets

METHOD FOR THE PROJECTION WELDING OF HIGH-CARBON STEELS AND HIGH-TENSION LOW-ALLOY STEELS

BACKGROUND OF THE INVENTION

1. Field of the Invention

This invention relates to a method for the projection welding of high-carbon steels, and high-tension low-alloy steels.

2. Description of the Prior Art

Projection welding is a method of lap resistance welding like spot or seam welding. A high current and a high pressure are concentrated on the projections formed on one or both of two parts to be joined, so that the heat generated by their contact and specific resistances may melt the materials and join the parts together, as is well known. Corners, edges, ends, bulged portions, etc. on the parts are sometimes utilized without any such projection being formed.

For projection welding, it is necessary that a movable electrode be so low in inertia and friction as to be capable of following the decay of the projections precisely, and that a uniform pressure be applicable by the whole electrode to enable uniform multi-spot welding. Projection welding requires a rigid welding machine and an accurately and quickly responding mechanism for applying pressure. Thus, there is a welding machine designed exclusively for projection welding.

Projection welding undesirably requires a better welding machine of higher performance and the preparation of projections with a considerably high dimensional accuracy, but also has many merits as stated below:

(1) It is useful even for the joining of parts differing from each other in thickness and therefore in heat capacity, since the projections formed on the part having the larger thickness make it easy to obtain a thermal equilibrium;

(2) It is useful even for the joining of different kinds of metals, since the projections formed on the metal superior in thermal conductivity make it easy to obtain a thermal equilibrium;

(3) The electrode having a large surface area is beneficial for mechanical strength and thermal conductivity, and is consumed only slowly;

(4) The uniform application of current and pressure to all of the spots to be welded gives substantially uniformly welded spots of high reliability;

(5) The simultaneous welding of a multiplicity of spots ensures a very quick and efficient job;

(6) The use of a special electrode or jig enables the accurate welding of parts complicated in shape; and (7) It is useful for the joining of a wide range of materials, including steel, bronze, stainless steel, a nickel or aluminum alloy, and a combination of steel and brass or bronze.

Despite its numerous merits stated above, however, no projection welding has been applicable to the joining of two parts of high-carbon structural steel having a high hardenability, or of a part of high-carbon steel and another of high-tension low-alloy steel. Although projection welding is useful for joining different kinds of metals, or a wide range of materials as stated, it is applicable only to materials having a low carbon content and not showing any welding defect, such as cracking, and is hardly applicable to high-carbon structural steels of high hardenability, or high-tension low-alloy steels, such as S45C, SCM, SCNM or HT780. No sound welded joint free from any welding defect can be obtained on any such high-carbon, or high-tension low-alloy steel, since carbon promotes cracking or an increase of hardness as a result of rapid heating and cooling by which resistance welding is characterized. Thus, there has not been any method of projection welding used successfully in joining S45C or like high-carbon, and high-tension low-alloy steels.

SUMMARY OF THE INVENTION

Under these circumstances, it is an object of this invention to provide an improved method of projection welding which enables the sound welding of high-carbon, and high-tension low-alloy steels by an existing projection welding machine.

This object is essentially attained by a method for the projection welding of two parts of which at least one is of high-carbon, or high-tension low-alloy steel, wherein a spacer is disposed between those parts. The high-carbon steel may be any structural steel of high hardenability, such as S45C, SCM, SCNM or HT780, and the spacer may be in the form of a thin sheet having a thickness of 50 microns to 0.4 mm, or a coating having a thickness of 10 to 100 microns. If the spacer is a coating, it may be formed on at least one of the parts to be welded, or a combination of a thin sheet and a coating can alternatively be formed on one of the parts. The spacer may be of low- or ultralow-carbon steel having a carbon content of 0.05% or less, or pure nickel or copper, and the coating may be of iron, nickel or copper. The welding may be carried out in a non-oxidizing or reducing gas atmosphere, or in a vacuum.

The spacer is intended for diluting the carbon in the parts to be welded, and thereby avoiding any cracking, or increase of hardness caused by carbon. When the projections are gradually decayed by an electric current to form nuggets, the spacer is also melted into the nuggets and its material dilutes the carbon in the nuggets. The spacer, which is a thin sheet, or coating, forms a thin soft layer in the center of each joint.

The spacer preferably has a thickness of 50 microns to 0.4 mm if it is in the form of a thin sheet. A sheet having a thickness smaller than 50 microns is too expensive to be easily available on the market and is not easy to handle, either. A sheet having a thickness over 0.4 mm forms a joint layer having a substantially equal thickness irrespective of its own thickness if pressure is applied under equal conditions, and if its thickness is too large, extra metal protrudes from the joint and gives it a poor shape. The spacer in the form of a coating preferably has a thickness of 10 to 100 microns. A coating having a thickness smaller than 10 microns may be useless, as it peels off in an instant if too high a pressure, or current is applied thereto. A coating having a thickness over 100 microns may be of low quality and fail to form a joint of high quality.

The spacer is preferably of low- or ultralow-carbon steel having a carbon content of 0.05% or less, or pure nickel or copper, so that it may not form any hard and brittle intermetallic compound, but may form in the center of a joint a soft and ductile layer which will act as a buffer to prevent any reduction in notch fatigue or static strength even if the joint may be so poor in shape as to form a notch.

The method of this invention is preferably carried out in a nonoxidizing or reducing gas atmosphere, or in a vacuum to ensure the formation of a joint of high quality, since the exposure of the joint to the air at a high temperature is likely to result in the oxidation of its outer or inner surface, the formation of pores, or its lowering in quality by absorbing oxygen from the air. It may also be effective to apply an electric current to the welded joint again to lower its hardness and improve its elongation and toughness to a further extent by resistance heating.

Other features and advantages of this invention will become apparent from the following description and the accompanying drawings.

DESCRIPTION OF THE PREFERRED EMBODIMENTS

Figure 1:
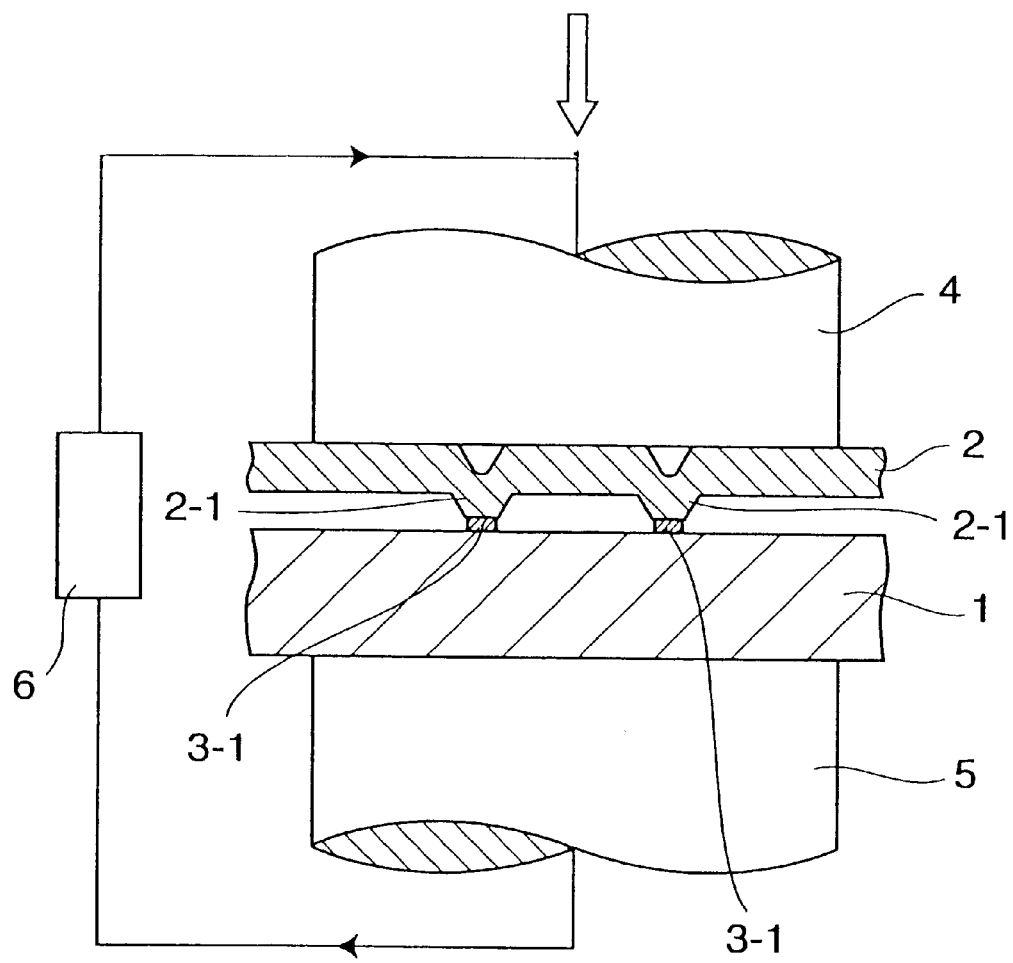
FIG. 1 is a diagram for explaining a method for projection welding embodying this invention.

The invention will now be described in further detail with reference to the accompanying drawings showing a few preferred embodiments thereof. Referring first to FIG. 1, a method embodying this invention is intended for welding a thick steel sheet 1 and a thin steel sheet 2 together. Both of the steel sheets 1 and 2 are of a high-carbon steel, or a high-tension low-alloy steel. The thin steel sheet 2 has a plurality of projections 2-1 which are each spaced apart by a spacer 3-1 from the thick steel sheet 1. The spacer 3-1 may be a thin sheet having a thickness of 50 microns to 0.4 mm, or a coating having a thickness of 10 to 100 microns. The spacer 3-1 in the form of a coating may be a single layer formed on the projection 2-1 or the thick steel sheet 1, or a combination of two layers formed on both sides. The spacer 3-1 may also be formed by a combination of a thin sheet and a coating, in which the coating may be a single layer, or a combination of two layers as mentioned above. The spacer 3-1 is of low- or ultralow-carbon steel having a carbon content of 0.05% or less, or pure nickel or copper.

In the method as shown in FIG. 1. In the case where the steel sheets 1 and 2 to be welded together, a spacer 3-1 is located between the projection 2-1 provided on the thin steel sheet side and the thick steel sheet 1, the steel sheets 1 and 2 are held together between a movable electrode 4 and a stationary electrode 5, and while the movable electrode 4 is lowered to apply pressure to the thin steel sheet 2, an electric current is supplied from a power source 6, and concentrated on the projections 2-1 to weld the sheets 1 and 2 together. The projections 2-1 and the spacers 3-1 are melted together by the heat generated by the contact and specific resistances of the thick steel sheet 1 and the projections 2-1 and form nuggets having a carbon content lowered by the molten spacer material therein to thereby form a sound welded joint having no crack or other defect resulting otherwise from an increase of hardness, even though the sheets 1 and 2 may be of a structural steel of high hardenability, such as S45C, SCM or SCNM, HT 780 or a high-tension low-alloy steel, such as SHY.

Figure 2:
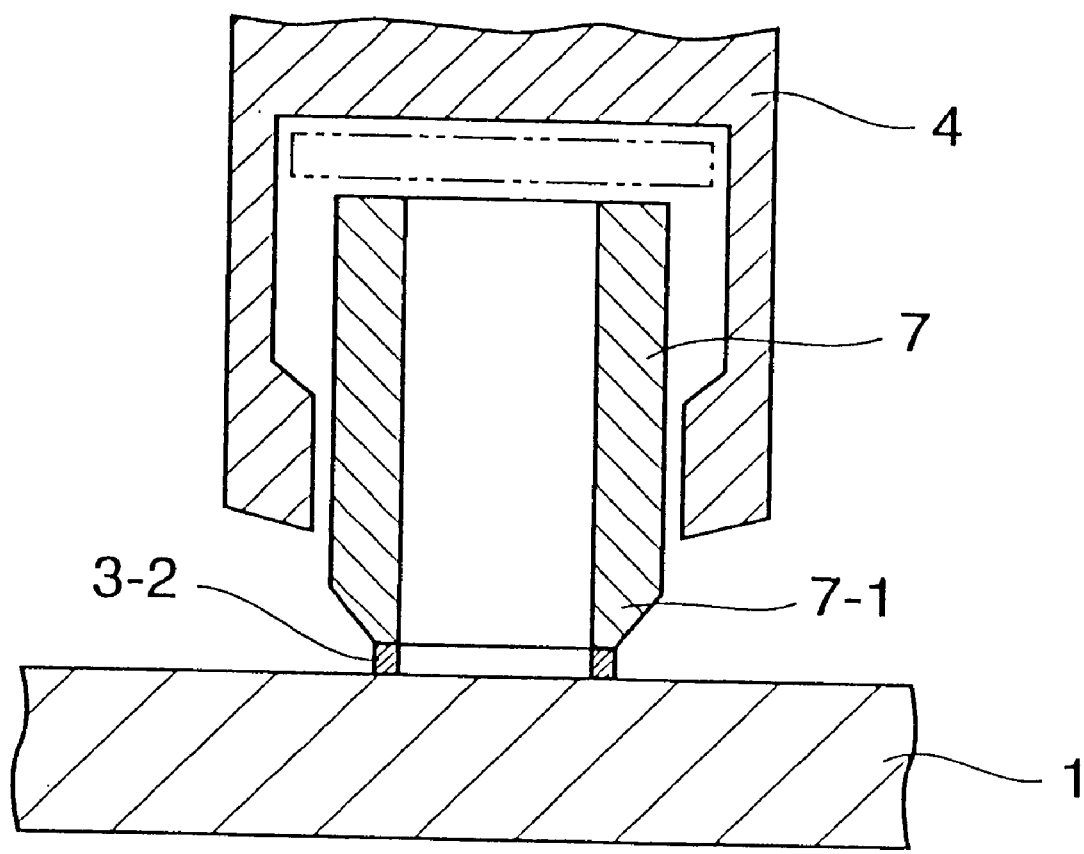
FIG. 2 is a diagram for explaining a method according to another embodiment of this invention.

Referring now to FIG. 2, a method according to another embodiment of this invention is used for welding a thick steel sheet 1 and a cylindrical body 7 together. The sheet 1 and the cylindrical body 7 are each of any of the materials as already stated above. The cylindrical body 7 has a lower end so shaped as to define a projection 7-1 and a spacer 3-2 is located between the projection 7-1 and the steel sheet 1. The spacer 3-2 may be of the same material and composition as already stated above. In the same method as show in FIG. 1. The steel sheet 1 and the cylindrical body 7 are held together between a movable electrode 4 and a stationary electrode 5 not shown, and while the movable electrode 4 is lowered to apply pressure to the cylindrical body 7, an electric current is supplied from a power source not shown to weld the steel sheet 1 and the cylindrical body 7 together. The projection 7-1 and the spacer 3-2 are melted together by the heat generated by the contact and specific resistances of the thick steel sheet 1 and the projection 7-1 and form a nugget having a carbon content lowered by the molten spacer material therein to thereby form a sound welded joint having no crack or other defect.

Figure 3:
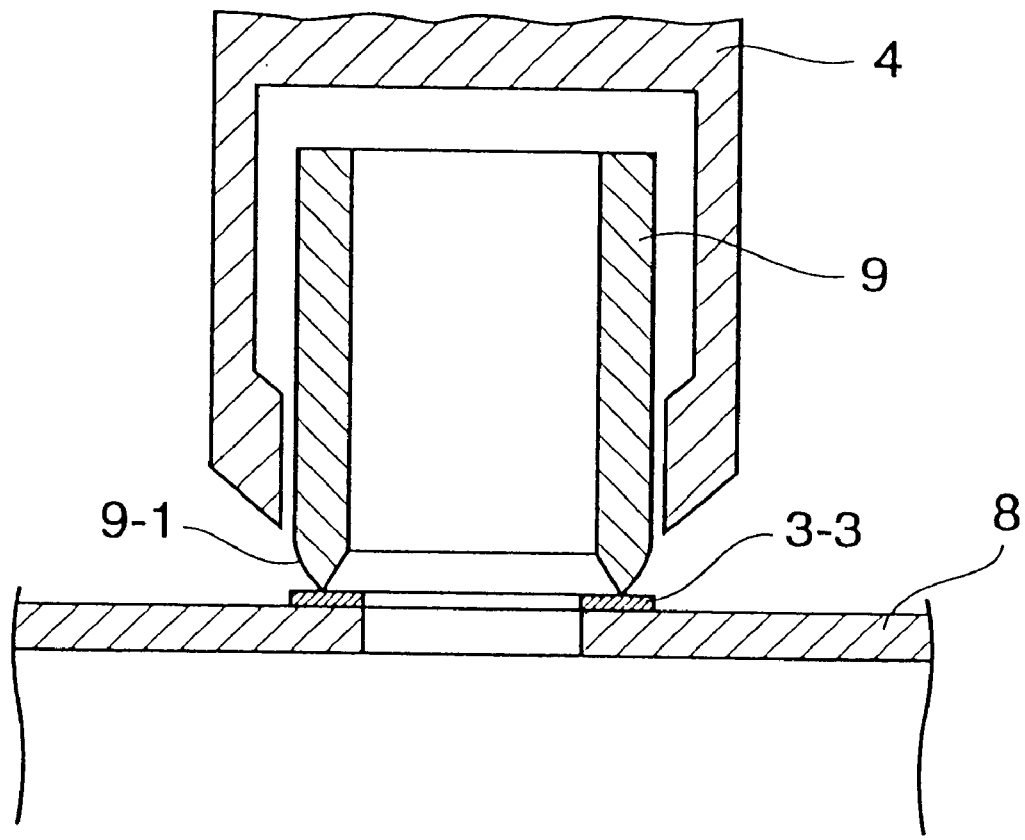
FIG. 3 is a diagram for explaining a method according to still another embodiment of this invention.

Referring now to FIG. 3, a method according to still another embodiment of this invention is used for welding a steel pipe 8 and a cylindrical body 9 together. They may both be of any of the materials as already stated before. The pipe 8 has an opening, and the cylindrical body 9 has a lower end so shaped as to define a projection 9-1 spaced apart from the pipe 8 by a spacer 3—3 encircling its opening. The pipe 8 and the cylindrical body 9 are held together between a movable electrode 4 and a stationary electrode 5 not shown, and while the movable electrode 4 is lowered to apply pressure to the cylindrical body 9, an electric current is supplied from a power source not shown to weld the pipe 8 and the cylindrical body 9 together. The projection 9-1 and the spacer 3—3 are melted together by the heat generated by the contact and specific resistances of the pipe 8 and the projection 9-1 and form a nugget having a carbon content lowered by the molten spacer material therein to thereby form a sound welded joint having no crack or other defect.

The method of this invention makes it possible to form a sound welded joint having no defect between parts of structural steels of high hardenability and high-tension low-alloy steels by projection welding, while it has hitherto been impossible, as stated above. Therefore, the method of this invention is very useful in the manufacture of various kinds of products made of structural steels of high hardenability or high-tension low-alloy steels, and required to be of high quality and reliability, such as high-pressure fuel injection pipes for motor vehicles, push rods and cross shafts for fans.

EXAMPLE 1

A few experiments were made for the projection welding of a sheet of S45C structural steel of high hardenability having a thickness of 6 mm and a cylindrical body of the same material having an outside diameter of 12 mm, an inside diameter of 3.3 mm and a projecting end diameter of 6 mm. According to this invention, a spacer was employed in each case. It was a thin annular sheet of SPCC, or pure nickel or copper having an outside diameter of 6 to 8 mm, an inside diameter of 3 mm and a thickness of 0.3 mm. The experiments were made by employing the welding conditions shown in Table 1, and the results are shown in Table 2. The tables also include a case according to the prior art in which no spacer was employed. As is obvious from Table 2, a sound welded joint having no crack or other defect could be obtained in every case where the method of this invention was employed, while cracking occurred when no spacer was employed.

TABLE 1

| Case No. | Pressure (kgf) | Current (A) | Duration of current application (cycles) |
|---|---|---|---|
| Invention 1 | 280 | 9300 | 40 |
| 2 | 280 | 9200 | 40 |
| 3 | 280 | 9100 | 40 |
| Prior art | 280 | 9500 | 40 |

TABLE 2

| | Material | Spacer | | Welding |
|---|---|---|---|---|
| Case No. | of parts | Material | Thickness | results |
| Invention 1 | S45C | Thin sheet of SPCC | 0.3 mm | No defect |
| 2 | S45C | Thin sheet of pure nickel | 0.3 mm | No defect |
| 3 | S45C | Thin sheet of pure copper | 0.3 mm | No defect |
| Prior art | S45C | None | | Cracking |

EXAMPLE 2

A few experiments were made for the projection welding of a sheet of SCM structural steel of high hardenability having a thickness of 6 mm and a cylindrical body of the same material having an outside diameter of 12 mm, an inside diameter of 3.3 mm and a projecting end diameter of 6 mm. According to this invention, an iron, nickel or copper coating having a thickness of 20 to 35 microns was formed as a spacer in each case. The experiments were made by employing the welding conditions shown in Table 3, and the results are shown in Table 4. The tables also include a case according to the prior art in which no spacer was employed. As is obvious from Table 4, a sound welded joint having no crack or other defect could be obtained in every case where the method of this invention was employed, while cracking occurred when no spacer was employed.

TABLE 3

| Case No. | Pressure (kgf) | Current (A) | Duration of current application (cycles) |
|---|---|---|---|
| Invention 1 | 280 | 9500 | 40 |
| 2 | 280 | 9700 | 40 |
| 3 | 280 | 9600 | 40 |
| Prior art | 280 | 9600 | 40 |

TABLE 4

| | Material | Spacer | | Welding |
|---|---|---|---|---|
| Case No. | of parts | Material | Thickness | results |
| Invention 1 | SCM | Iron coating | 0.3 mm | No defect |
| 2 | SCM | Nickel coating | 0.3 mm | No defect |
| 3 | SCM | Copper coating | 0.3 mm | No defect |
| Prior art | SCM | None | | Cracking |

What is claimed is:

1. A method for projection welding comprising:
   providing two parts made of a high-carbon steel or a high-tension low-alloy steel that is prone to cracking and increased hardness in response to welding, and at least one of said parts being provided with at least one projection thereon;
   providing a spacer between said two parts at least at locations aligned with the projection, said spacer being formed from a material having a substantially lower carbon content than either of said two parts;
   pressing the parts toward one another and against the spacer;
   applying current to the parts for melting the spacer and for diluting the carbon in areas of the two parts to be welded, such that areas of the parts having the diluted carbon are softened and define a crack resistant buffer between the parts.

2. A method for the projection welding of two parts according to claim 1, wherein the high-carbon steel is a structural steel of high hardenability such as S45C, SCM, SCNM or HT780.

3. A method for the projection welding of two parts according to claim 1, wherein the spacer is in the form of a thin sheet.

4. A method for the projection welding of two parts according to claim 3, wherein the thin sheet has a thickness of 50 microns to 0.4 mm.

5. A method for the projection welding of two parts according to claim 1, wherein the spacer is formed by a coating formed on at least one of the parts.

6. A method for the projection welding of two parts according to claim 5, wherein the coating has a thickness of 10 to 100 microns.

7. A method for the projection welding of two parts according to claim 1, wherein the spacer is formed by a combination of a thin sheet and a coating formed on one of the parts.

8. A method for the projection welding of two parts according to claim 3, wherein the thin sheet is of a material selected from low- or ultralow-carbon steel having a carbon content of 0.05% at maximum, pure nickel and pure copper.

9. A method for the projection welding of two parts according to claim 5, wherein the coating is of a material selected from iron, nickel and copper.

10. A method for projection welding, comprising:

providing a first part with surface region and a cylindrical second cylindrical part with an axial end, of said first and second parts being made of a high-carbon steel that is prone to cracking and increased hardness in response to welding;

providing a thin metallic spacer between the outer surface of the first part and the axial end of the cylindrical second part, said spacer being formed from a metal material having a carbon content of no more than 0.05%;

subjecting the axial end of the second part to pressure against the spacer and the surface of the first part; and applying a sufficiently high current to the parts for melting the spacer and diluting the carbon in areas of the parts adjacent the spacer such that areas of the parts with the diluted carbon are softened and define a crack resistant buffer between the parts.

11. The method of claim 10, wherein the surface of the first parts are formed from a high-carbon steel.

12. The method of claim 10, wherein the surface of the first part is planar.

13. The method of claim 10, wherein the surface of the first part is cylindrically generated.

14. The method of claim 10, wherein the spacer has a thickness of 10 microns–0.4 mm.

15. A method for the projection welding of two parts according to claim 1, wherein the thin sheet is of a material selected from low- or ultra low-carbon steel having a carbon content of 0.05% at maximum, pure nickel and pure copper.

* * * * *